Oct. 23, 1956 L. V. SAUL 2,767,685
SHACKLE FOR SHEEP
Filed July 8, 1955
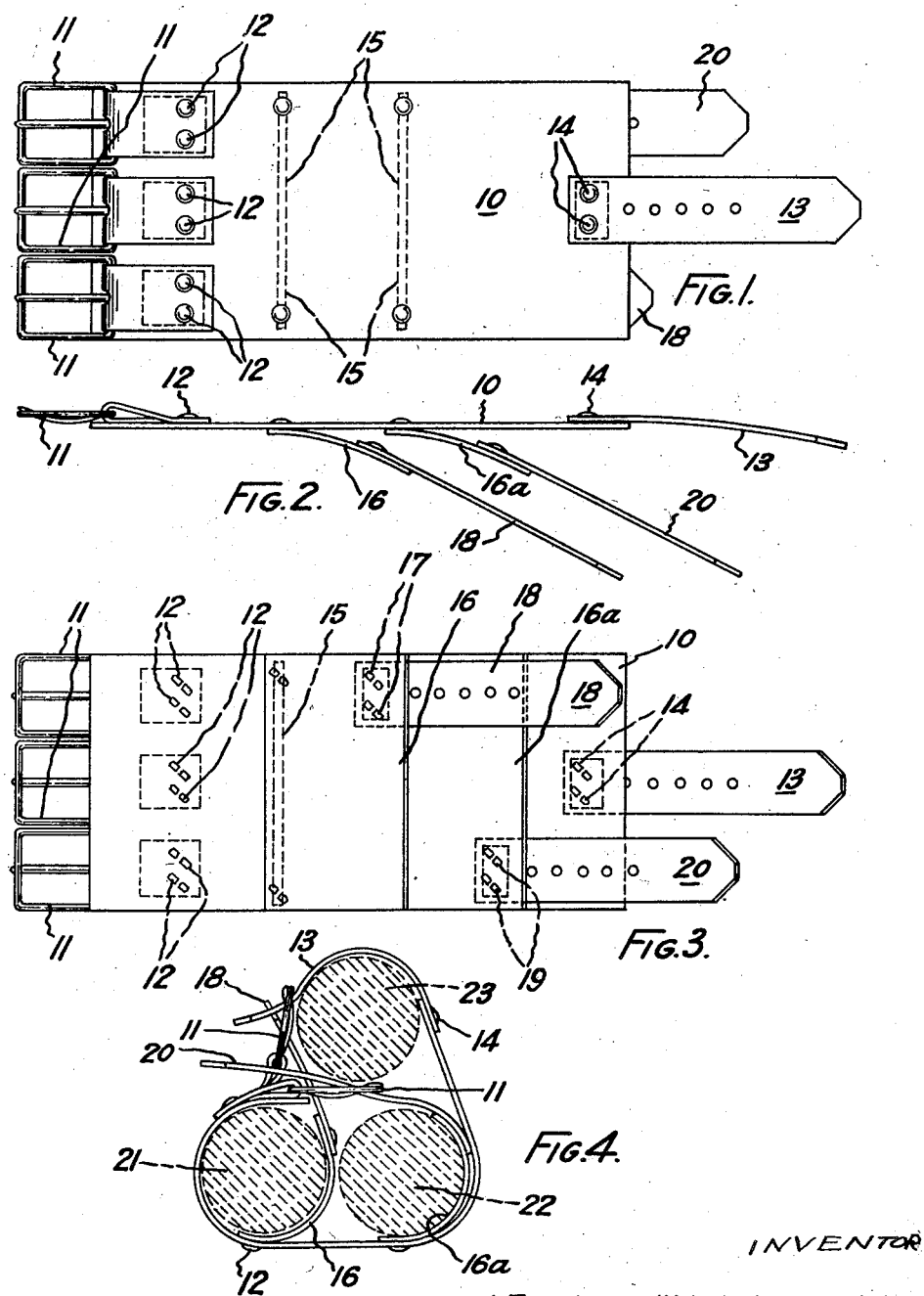
INVENTOR
LESLIE VINCENT SAUL
by Mead, Browne, Schuyler & Beveridge
ATTORNEY United States Patent Office 2,767,685
Patented Oct. 23, 1956

2,767,685

SHACKLE FOR SHEEP

Leslie Vincent Saul, St. George, Queensland, Australia

Application July 8, 1955, Serial No. 520,835

2 Claims. (Cl. 119—128)

On sheep grazing property it is necessary to be constantly on the alert to detect sheep which need attention, such as those that have been struck by the fly, those that have escaped having their tails docked, due to oversight or otherwise, and those which require other veterinary care.

It is not always possible, or at any rate practicable, to attend to the animals on the spot and it is customary to tie their legs together and throw them over the saddle or into the back of a truck so that they can be conveyed to a yard or shed where they can be given the attention necessary. Usually the two back legs and one of the front legs of the animal are fastened together, the other front leg being left free to allow the animal to breathe more freely. The fastening means usually consists of a short length or relatively soft wire.

In attempting to free itself from the bond the animal's legs often become badly bruised, and with rough handling there is always the possibility that one or more of its legs will be broken.

The present invention succeeds in providing means whereby the animal can be effectively secured with minimum discomfort and in such a way that its legs are not like to be broken as when being thrown roughly into a truck.

Briefly, the shackle provided by this invention comprises a flexible backing furnished with fastening means to constitute a bracelet, and having separate strips of flexible material stitched or otherwise attached to its inner face, said strips also being furnished with fastening means, the whole being adapted to hold three legs of an animal securely together.

In order however that the invention may be clearly understood and readily carried into practical effect reference is now made to the accompanying drawings wherein:

Figure 1 is a plan view of the shackle in its preferred form and as spread out in readiness for use, its outer face in this instance being uppermost.

Figure 2 is a side elevation of the shackle shown by Figure 1.

Figure 3 is a plan of the shackle, corresponding to Figure 1, but with its inner face uppermost.

Figure 4 is an end elevation of the shackle as it appears when fastened upon an animal.

The device illustrated is in the form of a bracelet and is made of leather, though it could be of any other tough, flexible material of appropriate nature such as rubber. It comprises primarily a rectangular sheet 10 which if desired may have padding applied to its inner face.

At one end of the sheet 10 there are three similar buckles 11, attached to the sheet as by rivets 12. At the other end of the sheet 10 there is a short fastening strap 13, attached as by rivets 14. Secured to the middle portion of sheet 10 by stitching such as 15 are two leather strips 16 and 16a. The strip 16 has attached to it as by rivets 17 a short fastening strap 18, and the strip 16a has attached to it as by rivets 19 a short fastening strap 20.

In use the left front leg of the animal to be transported, represented by the cross-hatched circle 21 in Figure 4, is grasped and encircled by the left-hand portion of the sheet 10, and strip 16, the fastening strap 18 being tightened and secured in the buckle 11 opposite to it.

The corresponding hind leg 22 of the animal is then grasped and secured between the strips 16 and 16a by fastening the strap 20.

Finally the other hind leg 23 of the animal is grasped and secured between the right-hand end portion of sheet 10 and the strip 16a, the strap 13 and the buckle 11 opposite to it being employed as the securing means in this instance. With three of its legs thus firmly trussed parallel to each other the animal can be placed in the saddle, or in a truck, and transported without risk of its legs becoming crossed in such a position that they are likely to be fractured.

I claim:

1. A shackle for the legs of sheep or other animals comprising a sheet of tough, flexible material having a plurality of buckles arranged side-by-side and attached to one end portion of said sheet, a fastening strap attached to the other end portion of said sheet and arranged to be secured to one of said buckles, and two spaced transverse strips arranged parallel to each other and attached to the middle portion of the same face of said sheet, each of said two spaced transverse strips having a fastening strap secured thereto for engagement with another of said buckles.

2. A shackle for the legs of sheep or other animals comprising a sheet of tough, flexible material having three adjacent buckles attached to one end portion of said sheet, a fastening strap attached to the other end portion of said sheet and arranged to be secured to the middle one of said buckles, and two longitudinally spaced transverse strips arranged parallel to each other and attached at longitudinally spaced locations to the middle portion of the same face of said sheet, a fastening strap fixed to each of said strips and arranged in longitudinal alignment with an outer buckle to which said strap is to be secured, said strips being sufficiently long to partly encircle, respectively, one hind leg and the corresponding foreleg of the animal to be trussed.

References Cited in the file of this patent

FOREIGN PATENTS 157,374   Australia _____ July 1, 1954